United States Patent [19]

Bear

[11] Patent Number: 4,949,758
[45] Date of Patent: Aug. 21, 1990

[54] THIN-WALLED SMALL-BORE STEEL TUBE WITH CASE HARDENED INTERNAL SURFACE

[75] Inventor: William H. Bear, Edmonton, Canada

[73] Assignee: Quinn'S Oilfield Supply Ltd., Red Deer, Canada

[21] Appl. No.: 756,042

[22] Filed: Jul. 17, 1985

[51] Int. Cl.[5] .................... F16L 9/00; C22C 35/00
[52] U.S. Cl. ..................... 138/177; 148/150; 148/12.4; 148/145; 148/320; 148/909
[58] Field of Search ............... 138/177; 148/39, 150, 148/12.4, 145, 152

[56] References Cited

U.S. PATENT DOCUMENTS

| | | | |
|---|---|---|---|
| 2,256,455 | 9/1941 | Crawford | 148/150 |
| 2,604,419 | 7/1952 | Herbenar | 148/150 |
| 3,345,220 | 10/1967 | Haynes | 148/145 |
| 3,891,474 | 6/1975 | Grange | 148/39 |
| 4,204,892 | 5/1980 | Economopoulos | 148/39 |
| 4,210,468 | 7/1980 | McGee | 148/39 |
| 4,226,645 | 10/1980 | Waid et al. | 148/12.4 |
| 4,261,769 | 4/1981 | Usui | 148/39 |
| 4,366,008 | 12/1982 | Takeuchi et al. | 148/12.4 |

Primary Examiner—Henry J. Recla
Attorney, Agent, or Firm—Millen, White & Zelano

[57] ABSTRACT

The present invention relates to a process for hardening the interior surface of a long, thin-walled, small inside diameter, tubular member, such as a tube which would be used to form a downhole pump barrel. More particularly, it relates to a process involving progressive heating with an internally positioned, electro-magnetic induction coil, followed by immediate quenching with a quench ring assembly, to develop a martensitic case on the inner surface of the tube. The invention further extends to the apparatus utilized in conducting the process, and to the product tube itself.

5 Claims, 4 Drawing Sheets

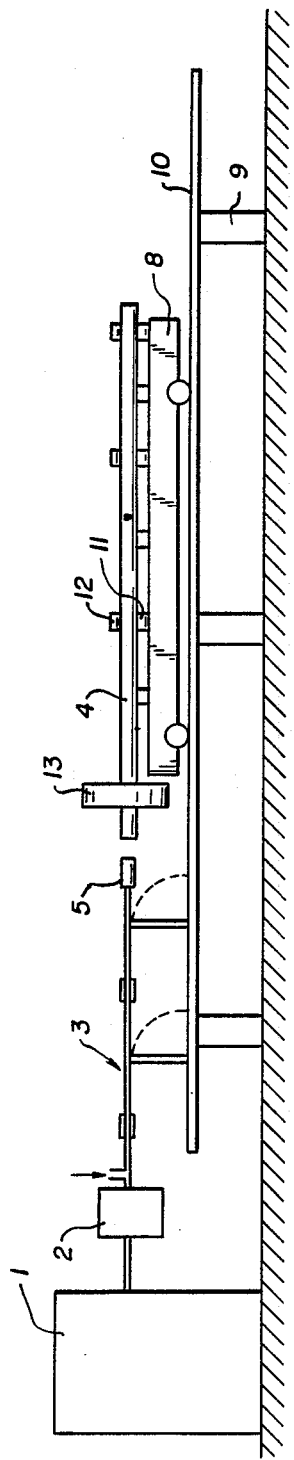
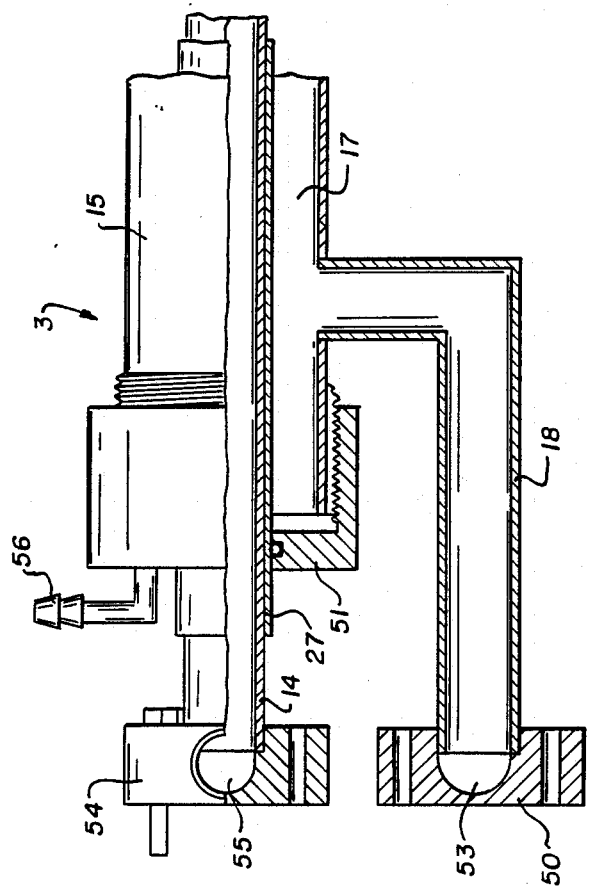

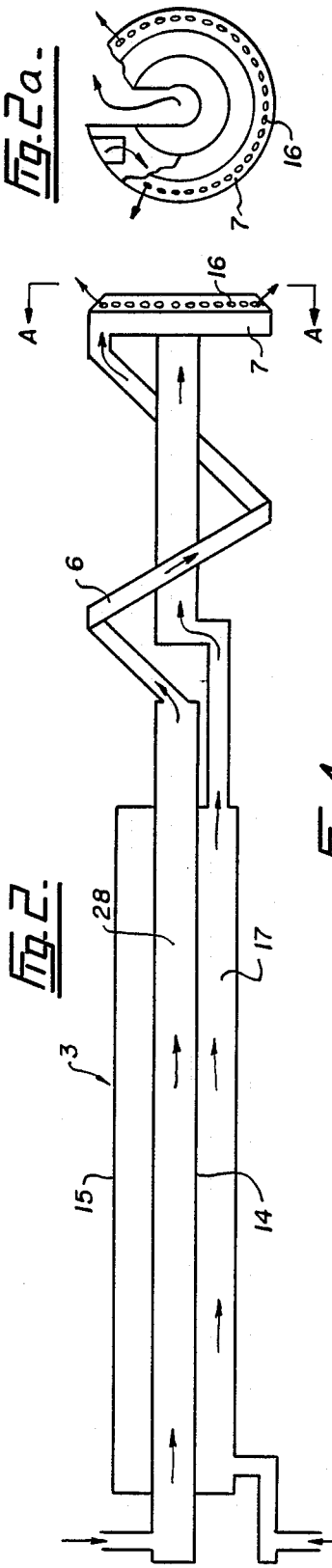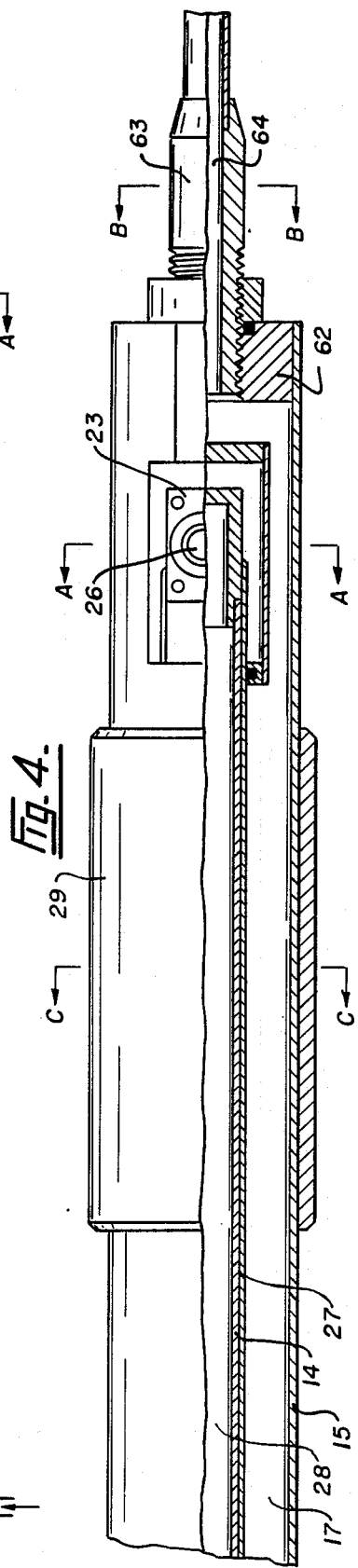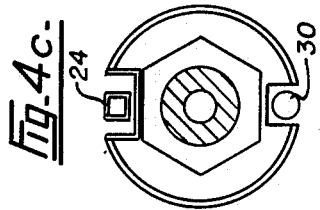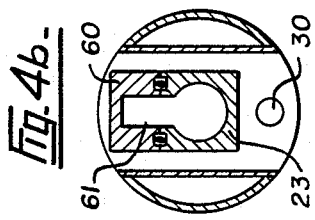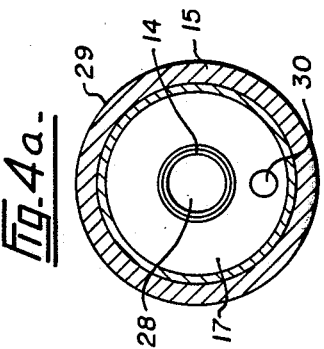

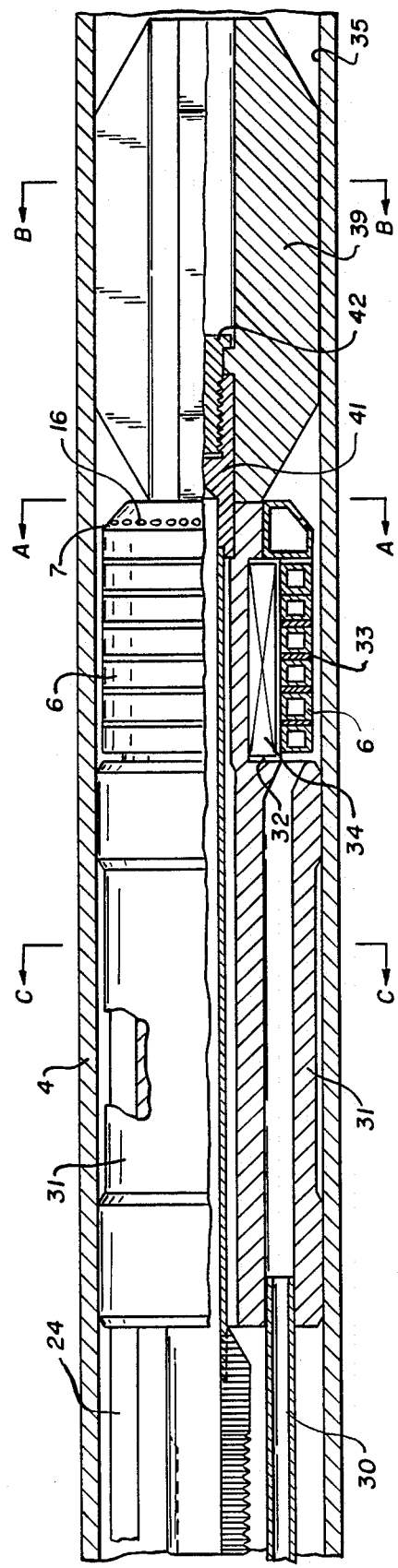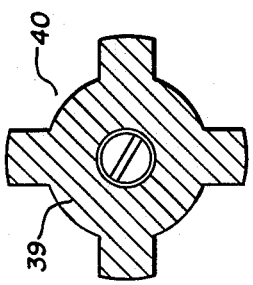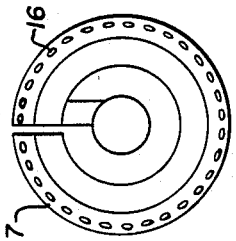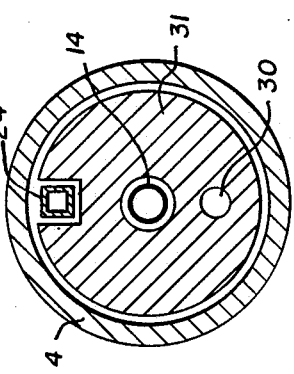

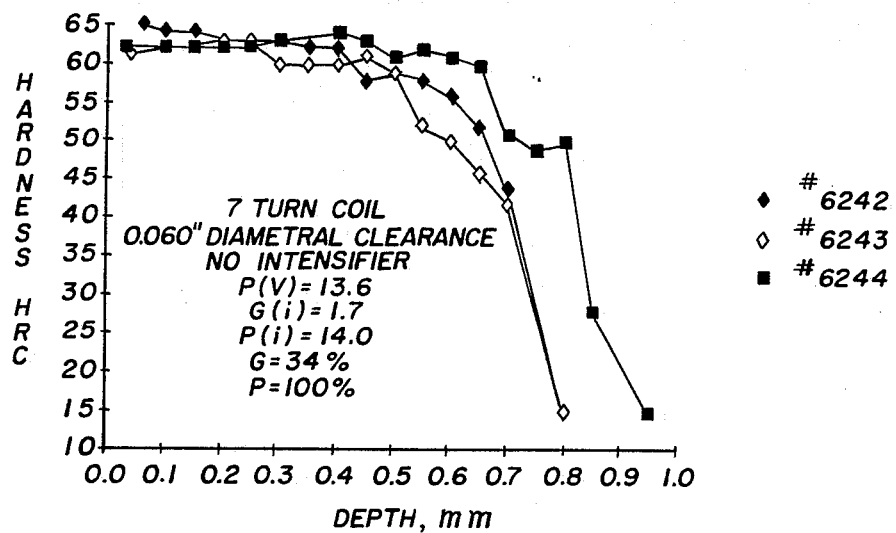
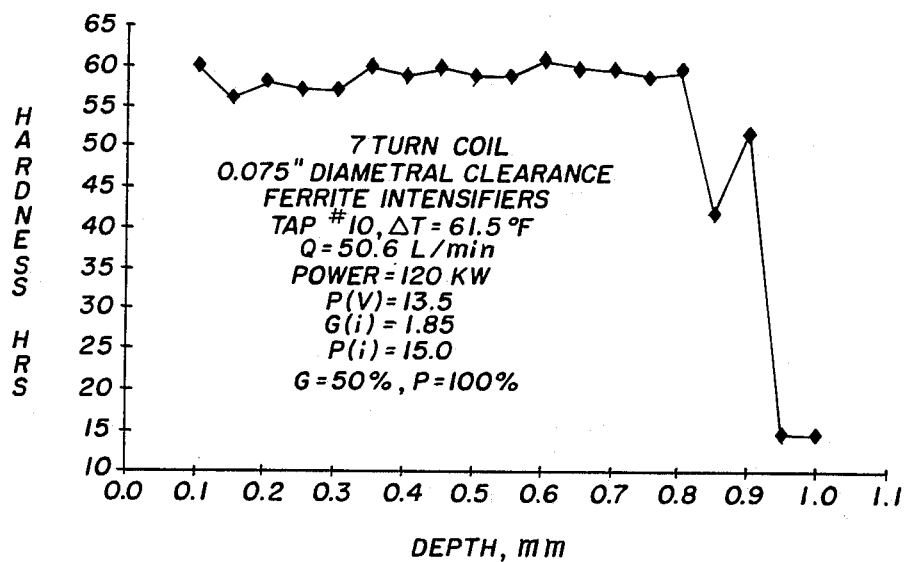

THIN-WALLED SMALL-BORE STEEL TUBE WITH CASE HARDENED INTERNAL SURFACE

FIELD OF THE INVENTION

The present invention relates to a process for hardening the interior surface of a long, thin-walled, small inside diameter, tubular member, such as a tube which would be used to form a downhole pump barrel More particularly, it relates to a process involving progressive heating with an internally positioned, electro-magnetic induction coil, followed by immediate quenching with a quench ring assembly, to develop a martensitic case on the inner surface of the tube. The invention further extends to the apparatus utilized in conducting the process, and to the product tube itself.

BACKGROUND OF THE INVENTION

The invention has been developed in connection with the manufacture of barrels for downhole pumps, such as are used in oil wells. Thus, because of this history, the invention will be described in connection with pump barrels, and the problems associated therewith. However, it is to be understood that the invention will also extend to the manufacture of long, thin-walled, small inside diameter tubes utilized in other applications.

By way of background, a downhole pump consists essentially of a steel barrel containing a reciprocating plunger, for moving the fluid, and suitable valve means, for controlling the admittance and discharge of fluid into and out of the barrel. The barrel is long, typically having a length in the range 6–30 feet. It is of small internal diameter, typically falling in the range 1 ¼"–3 ¼". And it is thin-walled, typically having a tube wall thickness in the range ⅛"–¼". In its simplest form, the barrel comprises a straight tube having strict tolerances with respect to internal diameter and concentricity of the internal diameter relative to the longitudinal axis of the barrel. Since efficient pumping requires minimal clearances between the plunger and the barrel inner surface, internal wear of the barrel wall is the prime determinant of barrel life, particularly, as so often happens, when abrasive particles are present in the pump fluids.

Initially, these barrels were constructed from soft metal pipe, but wear on the barrel rapidly resulted in loss of tolerance limits. In order to increase the service life of the barrels and, to provide abrasion resistance therefor, it was found necessary to harden the internal wear surface thereof.

Historically, the earliest hardened barrels were produced utilizing conventional heat treatment techniques. The barrel would be through-heated to the austenitic temperature in a furnace and then quenched by dropping it into a body of water. However, whilst the barrels so formed exhibited increased wear resistance, these through hardened barrels lacked the requisite toughness or impact strength properties, and, additionally, were found to be undesirably prone to stress corrosion cracking.

Attempts were then made to harden the inner surface only, utilizing an internal flame followed by a quench ring. The problem with this process resided in the inability to limit the heating to the inside layer of the thin wall, and thus prevent austenite being generated deeper in the wall than was desirable. Stated otherwise, the system did not permit enough heat to be applied in a short enough time and the quench coolant to be applied soon enough thereafter in sufficient volume, so that only a thin internal surface layer was heated to the austenitic temperature and that layer was cooled sufficiently quickly to form a sufficiently hard martensitic microstructure.

It has also become known to harden carburized or carbonitrided tubing by induction heating of the outside diameter of the barrel, or by conventional furnace heating allowed by a water quenching step. The inner surface only of the starting tube would have a high carbon content. Thus hardening would occur only at the inner surface section, while the thick outer section would remain tough and ductile, as is desired. The major disadvantages of this technique are associated with the lengthiness and high cost of the carburizing stage. Also, because of the high cost of carburizing, there is a tendency to shorten the carburizing treatment. This results in a very thin case being produced During the subsequent honing operation, this case is frequently found to have been completely, or partially, removed.

A recent development in the barrel hardening field employs steel tubing having sufficient carbon content to harden without provision of selective surface enrichment with either carbon or nitrogen. This process utilizes a low frequency induction heating, typically 3kHz to 10kHz, to through-heat the entire barrel wall from the outside inwardly. The tube, upon attaining the requisite quenching temperature, is quenched on the inside only, to thereby form an internal hardened case. In some cases, an external quench may also be applied. In this process, a short coil is positioned on the outside wall of the tube. The coil is functional to traverse the barrel, heating limited areas at a time, to thus limit the power requirements. The problem with this process is that the outer section of the barrel wall becomes hardened and is in tension. This condition is particularly susceptible to hydrogen embrittlement and cracking.

A search of the prior art has been conducted. Several patents, exemplary of which are U.S. Pat. Nos. 2,556,236 to Strickland, and U.S. Pat. No. 2,547,053 to Somes et al, were located which disclosed internal electromagnetic induction heating, followed by quenching, to thereby harden the internal bores of short workpieces, such as cylinders, bushings or the like.

The prior art patents specified above disclosed broadly the metallurgical concepts of:
rapidly heating a rotating, translating, tubular workpiece by means of an internally positioned, closely conforming magnetic induction coil, to thereby raise the temperature of a thin surface layer to a value greater than the austenitizing temperature, without heating the relatively thick outer portion of the wall to the austenitizing temperature; and
immediately quenching the austenitic surface layer to produce a tube having a relatively thin, hardened, martensitic inner surface layer, or case, having a Rockwell C hardness (HRC) in the order of 58-61 and exhibiting a compressive residual stress pattern, said case being contained by a relatively thick outer wall section which is in a tough, substantially non-hardened condition.

Mechanically, these prior art patents disclosed the following assemblies:
the provision of coaxial tubular power conductors extending along the axis of the tube from its first end and being connected with an induction coil for heating, said conductors being separated by insulation and otherwise being contiguous, said inner conductor forming a bore for supplying cooling water to the hollow coil;

the provision of a quench ring or head, secured to the end of the coil and connected to a water supply mandrel extending along the axis of the tube from its second end, said quench head having a spray outlet directed toward the tube s second end, so that the cooling water discharges away from the coil;

the bore of the coil communicating with an outlet so that the coil cooling water is discharged toward the second end of the tube;

said workpiece, coil, quench head, conductors and quench water mandrel being vertically disposed.

The prior art exemplified by these patents further recognized that it was necessary:

to supply high frequency, high density power rapidly to the workpiece, to obtain quench-hardening temperature of the thin surface layer and ensure non-hardening of the outer portion of the wall; and immediately quenching to thereby successfully harden the thin surface layer.

However, it is to be noted, that the above-mentioned patents employed short tubes having large internal diameters, typically about 6.5 inches. Additionally, the composition of the workpieces comprised alloy steels, which steels are relatively easily hardenable, entailing less criticality in the hardening process thereof with regard to the heating and quenching parameters.

There are, however, serious problems which arise when one attempts to apply these prior art techniques to elongated, thin-walled, small diameter tubes of a plain carbon steel or non-alloy containing feedstock, such as those used to form downhole pump barrels. These problems have presumably heretofore prevented the application of the internal induction heating technology, in a commercially viable process, to such barrels.

More particularly, the problems to be addressed included:

transmitting an adequate quantum of radio frequency power to the coil, given the long length of the conductor and thus the attendant line losses;

developing adequate electromagnetic coupling between the internally disposed induction coil and the workpiece, to thereby enable the necessarily large amount of power to be drawn from the generator;

developing high surface power density in the workpiece layer to be hardened, thereby supplying sufficient heat at a sufficiently rapid rate to the layer to attain a temperature therein substantially exceeding the austenitizing temperature and to thus effect the necessary carbon dissolution and homogenization in the metal before significant through wall heat transfer can result;

preventing back-flow of the quench water into the induction heating zone, which back-flow would counteract the heating effect;

delivering a sufficient volume of quench water at a suitable temperature to the heated austenitic surface layer, instantly upon termination of heating, to produce a case having martensitic microstructure;

overcoming the mechanical limitations imposed by the small internal diameter of the tube and the warpage problem associated With the thin-walled nature of the long tube;

and performing the above on the commercially available grades of tubing with normal manufacturing dimensional tolerances.

The ideal characteristics for a pump barrel comprise a tube formed of a composite material having a tough and ductile microstructure in the bulk of the wall thickness and a hardened internal surface layer or case. These properties impart abrasion resistance to the inner wear surface and impact resistance to the outer surface, together with a minimization in propensity to stress corrosion cracking. Preferably, the hardened case should have a thickness of less than 1.0 mm, a hardness exceeding HRC 58, and a substantially uniform martensitic microstructure. Furthermore, the barrel should exhibit a favorable residual stress distribution, with the inside surface preferably being in the highly compressive condition, and the outer core being non-hardened and exhibiting a low tensile residual stress condition. Typically, a desirable hardness profile would demonstrate a sharp demarcation between the hardened and non-heat affected zones.

The ideal characteristics for a manufacturing process to produce such a pump barrel would include relatively high treating speed and low cost.

It is an objective of the present invention to provide a solution to the afore-mentioned problems and further to provide a long, thin-walled, small-diameter tube having the preferred physical and metallurgical characteristics for a pump barrel.

SUMMARY OF THE INVENTION

In accordance with a process aspect, the invention comprises:

delivering sufficient radio frequency AC power to an induction coil disposed in the bore of a long, thin-walled, small-diameter, ferrous tube, and coupling the coil to the tube to electromagnetically induce a high power density in a surface layer of the tube, so as to raise the temperature of a longitudinal portion of the layer to a value substantially greater than the austenitizing temperature;

said tube having a length greater than about 8 feet and an inside diameter in the range of $1\frac{1}{4}$ to $3\frac{1}{4}$ inches, said tube preferably having a length in the range 8 to 32 feet, an inside diameter in the range $1\frac{1}{4}$ to $2\frac{1}{2}$ inches, and a wall thickness in the range $\frac{1}{8}$ to $\frac{1}{4}$ inch;

one of said coil and tube rotating and translating relative to the other, whereby the entire length of the layer is progressively heated to said temperature; delivering liquid coolant to the fully heated portion of the layer through an internally placed quench ring, as soon as said portion reaches said temperature; said power being supplied at a sufficient rate for a short enough period of time and said coolant being supplied at a sufficient rate soon enough after heating, so that the outer segment of the tube wall, beyond the layer, is left unhardened and the inner surface layer, preferably having a depth less than about 1 mm, is converted to a martensitic case, preferably having a surface hardness Rockwell Hardness C (HRC) value greater than about 58 and an effective case thickness to HRC 50 greater than about 0.5 mm; and propelling substantially all of said coolant, after it has quenched, through the already hardened end of said tube, so that it does not back into the heating zone.

The foregoing is preferably accomplished by the following combination of steps and means:

(1) delivering at least 115 KW of 180–400 kilohertz AC power to the coil through a tubular, electrically conductive power lead, said coil also being connected with a tubular, electrically conductive ground lead, said leads being substantially coaxial and spaced apart to form an annular passage, said coil being formed of electrically conductive tubing forming a bore which communicates with the power lead bore and the annular passage, the last turn of the coil being perforated to form an inductively active quench ring, said coil being closely coupled to the workpiece so as to deliver at least about 22 MW/m$^2$ power density (which corresponds with the output of the 115 KW in a 1 ½" I.D. tube);

(2) delivering sufficient coolant through the inner conductor bore and the annular passage to the quench ring whereby the coolant is applied to the fully heated portion of the tube layer almost instantly upon termination of heating and quenchs the layer to produce a martensitic case; and (3) mechanically propelling the coolant, after it has quenched the heated section of the tube layer, out through the hardened end of the tube.

In accordance with a product aspect, the invention comprises a long thin-walled small-bore steel tube of substantially constant chemical composition having a length of 8–32 feet, a wall thickness of ⅛–¼ inches, and an internal diameter of 1 ¼–3 ¼ inches, said tube having an internal substantially fully transformed martensitic surface case extending across its entire internal surface area, said case having a total depth less than about 1 mm and an effective case depth to HRC 50 of at least about 0.5 mm, said case having a surface hardness of at least HRC 58, the remaining outer base portion of the tube wall being substantially unhardened, the tube having been internally heated with an electrical induction coil delivering at least about 22 MW/m$^2$ power density and immediately quenched to produce the martensitic case, the quench fluid having been positively forced out of the bore after use, whereby there is provided a case having a substantially uniform martensitic microstructure, a sharp demarcation between the hardened case and the non-hardened base portion, and a case of generally even depth.

DESCRIPTION OF THE DRAWINGS

FIG. 1 is a schematic side view of the production assembly for practising the invention;

FIG. 2 is a simplified schematic side view of the conductor tube assembly and coil-quench ring assembly;

FIG. 2a is an end view along the line A—A of FIG. 2;

FIG. 3 is a partly sectional side view of the input end of the conductor tube assembly;

FIG. 4 is a partly sectional side view of the coil side of the conductor tube assembly showing the power terminals and coolant connections;

FIGS. 4a, 4b, 4c are end views taken along lines C—C, A—A, and B—B respectively., FIG. 5 is a partly sectional side view of the coil, the quench ring, and the coil centralizer/impellor assembly;

FIGS. 5a, 5b, and 5c are end views taken along the lines C—C, A—A and B—B respectively of FIG. 5:

FIG. 6 is a plot of the typical product's case hardness versus depth, derived from a run involving 2 passes and no intensifier in the coi; and FIG. 7 is a typical plot of the typical product's case hardness versus depth, derived from a run involving 1 pass using an intensifier in the coil.

DESCRIPTION OF THE PREFERRED EMBODIMENT

The Workpiece

The present invention is directed toward internally hardening long, thin-walled, small-bore, steel tubes. More particularly, such tubes may have a length up to about 32 feet. The word "tube" is intended to encompass a single length or a plurality of short lengths positioned in end to end relationship to form a single long unit for treatment. As stated, the tube is thin-walled, usually having a wall thickness in the range ⅛ to ¼ inches. It has a small inside diameter, (I.D.), usually in the range 1 ¼–3 ¼ inches, most frequently 1 ¼–2 ½ inches. The steel used may be a plain carbon steel, such as AISI C-1040, although the invention is expected to be applicable to various alloy steels as well. The tubes, which are amenable to the process and which have not heretofore been treated by internal induction hardening, will typically have a length to internal diameter (L/D) ratio falling in the range 38 to 270.

Following is a listing of plain carbon steel tubes which have successfully been hardened using the process:

| Length | I.D. (inches) | L/D Ratio |
|---|---|---|
| 28'1" | 1¼ | 269.6 |
|  | 1½ | 224.6 |
|  | 1¾ | 192.5 |
|  | 2 | 168.5 |
|  | 2½ | 134.8 |
| 8' | 1¼ | 76.8 |
|  | 1½ | 64.0 |
|  | 2 | 48.0 |
|  | 2½ | 38.4 |

Typically, the tube is an electrical resistance welded tube drawn over a mandrel to a finished diameter and normalized, all in accordance with ASTM A 513, type 5. It is formed of AISI C-1040 steel, has a length of 28'1", and O.D. of 1 ¾" and an I.D. of 1 ½".

The Apparatus

In General

Turning now to the schematic shown in FIG. 1, the apparatus comprises a conventional generator 1 and load coil transformer 2, capable of supplying radio frequency AC power and rated at 125 KW with a frequency variable between 180 and 400 khz. The generator/transformer assembly typically operates at a plate voltage of 14 kilovolts, grid current of 1.9 amperes, and a plate current of 14.5 amperes.

A coaxial conductor tube assembly 3 is provided to supply power from transformer 2 through the length of the workpiece or tube 4 to the induction coil/quench assembly 5. The conductor tube assembly 3 is further adapted to pass coolant (normally water) therethrough to the coil 6 and the quench ring 7 (the latter being the last turn of the coil). Thus, both the power and the water are supplied to the coil/quench assembly 5 from the same end of the tube 4.

A carriage 8 is mounted to reciprocate on a support 9 comprising a track 10. The track 10 is slightly inclined downwardly, (¼ inch to the foot), so that the quench water will drain by gravity out of the hardened end of the tube 4. The tube 4 is carried on rollers 11 mounted on the carriage 8. Means, not shown, are provided to reciprocate the carriage 8 longitudinally. Pressure rollers 12 hold the tube 4 in place against the rollers 11. A lathe chuck 13 is secured to the tube 4, for rotation of the latter. The chuck 13 may be rotated at variable speed by suitable means, not shown, to rotate the tube 4. Thus the tube 4 may be translated longitudinally and simultaneously rotated, each at controlled speed.

The Conductor Tube Assembly

Turning now to FIG. 3, the conductor tube assembly 3 is shown. Broadly, this assembly 3 comprises coaxial inner and outer tubular copper conductors 14, 15 The inner conductor 14 functions as the high potential lead to deliver power from the generator/transformer assembly to the coil 6. Water is pumped under pressure through the bore 28 of the high potential conductor 14, to cool it, and is discharged into the first input end turn of the coil 6, for cooling the coil as it passes therethrough. On entering the last turn of the coil, which is the quench ring 7, the water is sprayed through the orifices 16, for quenching. The outer conductor 15 functions as the ground potential lead extending back from the coil 6. Water is pumped under pressure through the annular passage 17, formed between the conductors 14,15 and is discharged into the quench ring 7 for spraying to quench the workpiece.

Having reference to FIG. 3, the input end of the conductor tube assembly 3 is shown In greater detail, a tubular ground power lead member 18 connects the outer (ground potential) conductor 15 with the ground terminal 50 of the generator/transformer assembly A connector (not shown) introduces cooling water through a bore 53 into the tubular ground power lead 18 and thus into the annular passage 17.

An end fitting 51 is screwed onto the input end of the outer conductor 15, to provide end closure thereof.

A high potential transformer/conductor terminal 54 is connected to the inner (high potential) conductor 14. A connector (not shown) introduces cooling water through the bore 55 into the inner conductor 14.

The inner conductor 14, coated with an insulating sheath 27, extends through the end fitting 51, into the bore of the outer conductor 15.

An air supply inlet 56 also extends through the end fitting 51 into the annular passage 17.

Turning now to FIG. 4, it shows the connections between the input end components of the conductor assembly 3 and its output end components. More particularly, the inner conductor 14 connects with a high potential terminal member 23. This member 23 connects to the coil high potential terminal member 60 (see FIG. 4b). The bore 28 of the high potential inner conductor 14 communicates with an aperture 26 formed in the terminal member 23 and therethrough with the bore 61 of the coil terminal member 60. Thus the high potential inner conductor 14 is connected to conduct radio frequency AC current to the coil 6 and is cooled by water moving through its bore 28 and the surrounding annular passage 17.

The ground potential outer conductor 15 connects to a conductor ground terminal 62, which, in turn, connects with the coil ground terminal member 63. Thus the coil circuit is completed and water is delivered to the quench ring 7 through the annular passage 17 and the bore 64 of the ground terminal member 63.

The outer conductor 15 is centralized in the workpiece tube 4 by teflon centralizers 29.

Typically, the inner conductor 14 has an O.D. of $\frac{3}{4}$", the outer conductor 15 has an O.D. of 1 $\frac{1}{4}$", the wall thickness of each conductor is 0.032", and the conductor tube assembly 3 is insertable in a workpiece tube 4 having a nominal I.D. of 1 $\frac{1}{4}$".

In an optional feature, the air line 30 extends through the annular passage 17, as shown, for assisting in clearing water downstream from the coil by directing compressed air thereacross.

Turning now to the output end of the conductor tube assembly 3, there is provided a tubular body 31 which supports and centralizes the coil 6. The body 31 is long relative to the coil 6. As shown, the body 31 is recessed, adjacent its output end, to define a channel 32, in which the coil 6 is seated. The coil 6 is a closely wound, multiple turn coil (typically 6-7 turns), with the turns insulated one from another by thin layers 33 of insulation. A core 34 of ferrite rods is positioned in the channel 32 within the coil 6, to intensify the power density penetrating the inner surface layer of the workpiece tube 4.

The body 31, typically formed of teflon, is machined to position the outer surface of the coil 6 very close (typically 0.030") to the inner surface 35 of the workpiece tube 4.

The quench ring 7 is inductively active, being part of the coil 6.

As shown in the Figures, the high potential inner conductor 14 is electrically connected to the first turn of the coil 6 and the ground potential outer conductor 15 is electrically connected to the quench ring 7. The stream of water passing through the bore 28 of the inner conductor 14 flows through the input end turns of the coil 6 and into the quench ring 7, and the stream of water passing through the annular passage 17 flows directly into the quench ring. The pressurized water sprays out of the quench ring orifices 16 at an angle of about 40° (relative to a line perpendicular to the workpiece tube surface 35) and strikes the surface 35 immediately behind the preceding heating zone of the coil 6.

An impellor body 39 is attached to the coil 6 downstream of the quench ring 7. The body 39 is fluted, to provide passages 40 for the flow of the quench water out the output end of the workpiece tube 4. A fitting 41 is secured to the output end of the inner conductor 14. A fastener 42 is threaded into the fitting 41 and locks the impellor body 39 to the remainder of the conductor tube assembly 3.

When the tube 4 is rotated about the impellor body 39, the two parts combine to mechanically propel the quench water out the output end of the tube 4.

Now, the problems, both apparent and discovered, inherent in using internal induction heating to harden the inner surface 35 of the long, thin-walled, small-diameter workpiece tube 4, included the following:

(1) difficulty in supplying the very large quantum of AC power needed to heat a layer of tube wall of less than 1 mm depth to a temperature in the order of 900° C., in a time period in the order of 0.6 seconds, without heating the outer portion of the tube wall to the austentizing temperature (about 800° C.), and without excessive line losses;

(2) difficulty in successfully coupling the coil 6 with the tube wall, so that the power reached its intended heating zone with sufficient power density, without electrically arcing the coil in the process;

(3) difficulty in bringing the quench water into contact with the just-heated layer sufficiently quickly and in sufficient volume so as to ensure the development of a martensitic microstructure, again in the context of having to avoid heating the bulk of the tube wall to the austenitizing temperature; and (4) difficulty in removing the quench water sufficiently swiftly, so that it would not back up into the heating zone.

By utilizing a liquid cooled, coaxial, spaced, thin-walled, large diameter, double tube conductor assembly, applicant found that the necessary large quantum of power could be delivered through to the far end of the workpiece tube, without excessive line losses. In addition, sufficient coolant having an adequately low temperature, could be delivered to effect the necessary quenching in a desirable manner. All of this was found to be feasible, in spite of the limited space available in the small inside diameter workpiece tubes.

By utilizing a carefully centralized, close coupled, preferably intensified, multiple turn coil, applicant was able to successfully couple the coil to the workpiece to produce the desired heating effect in the latter.

By forming the inductively active last turn of the coil into the quench ring, applicant was able to bring the orifices very close to the margin of the heated zone and thus minimize the delay time from removal of heating to application of quench. It further minimizes cooling by radiation due to the proximity of the 900° C. tube surface to the cool coil. These factors assist in developing a desirable hard martensitic case.

And finally, by providing means, immediately downstream of the quench ring, for displacing the quench water, applicant was able to swiftly remove the copious quantities of water being used and avoid having it back up into the heated zone.

By the preferred combination o& these components and arrangements, applicant obtained an assembly capable of hardening the interior surface of a small-diameter, long, thin-walled tube, even one made of plain carbon steel, in a rapid, relatively inexpensive manner.

In the course of the work, a preferred set of operating conditions have been developed for 1 ½" I.D. tubing. These are as follows:

frequency range : 180–400 kilohertz
minimum power required at coil : 115 KW
diametral clearance of coil : 0.075"
number of coil turns :7–8 of ¼ square copper tubing
time during which a unit of the tube wall is heated : about 0.6 seconds
speed of translation of coil : about 60 mm/second
desired temperature to which workpiece is heated : greater than 800° C., preferably about 900° C.
desirable volume of quench water at ambient temperature (e.g., 42° F.) : about 50 litres/minute
water pressure : about 215 psig
angle of water spray : about 40°
tube rotation : about 180 rpm

The Product

The product is a non-through hardened steel tube, having an internal case produced by surface induction hardening using an internally placed coil and quench ring, which tube may be characterized as follows:

length : 8–32'
inside diameter : 1 ¼–3 ¼"
wall thickness : ⅛–¼"
internal hardened case thickness : <1 mm
case hardness : Rockwell Hardness C≧58
case microstructure : martensitic
balance of tube wall : non-hardened More particularly, with respect to case thickness, I prefer to produce a case less than 0.8 mm (0.032") on a 3.2 mm (⅛") wall thickness barrel. On a thicker wall, the case may be slightly thicker. Typically, the effective case (the depth below surface where the hardness falls to HRC 50) is 0.6 to 0.8 mm (0.024 to 0.032") and the total heat affected zone (the depth at which the base or original hardness is reached) is equal to or less than about 1.0 mm. For wear resistance considerations, a minimum hardness at the finished (honed) surface of about HRC 58 should be attained. Hardnesses of HRC 60 have been attained on a consistent basis by the present invention.

The case profile, as measured by microhardness measurements, ideally is relatively constant for the effective case depth and then decreases to the base hardness level in an abrupt manner. The above criteria describe a case having, for plain carbon steels, excellent wear characteristics and a sufficient case thickness to withstand case crushing due to point loading by discrete sand particles.

FIGS. 6 and 7 illustrate typical profiles for cases developed in accordance with the present invention.

Advantages

The invention is characterized by the following advantages:

(1) The process produces an internal case particularly well suited for hardened steel pump barrels.

(2) The process is suited for use with inexpensive plain carbon steels. Good case and outer segment properties are developed in steel having a constant chemical composition, making it unnecessary to employ relatively expensive surface carbon enrichment processes.

(3) The process develops a case having a consistent, high hardness through the effective case depth with an abrupt and rapid decrease to the base hardness.

(4) Due to the magnitude of surface power densities developed, the process produces thin cases (typically 0.5 to 1.0 mm) on thin-walled tubes. This, in combination with the hardness profile achieved, ensures the development of residual compressive stresses in the case. Such residual compressive stresses characterize a case which resists embrittlement or stress corrosion cracking.

(5) The microstructure of the case is quite uniform, thereby minimizing galvanic corrosion problems.

(6) The process is well suited to close control over the process parameters affecting the physical and metallurgical properties of the hardened case and core microstructure. This allows case depths to be controlled and consistently reproduced.

(7) The process and apparatus are relatively inexpensive and adaptable to automation.

(8) Of importance is the extremely high production rates which characterize the process. For example, heat treatment of 1 ½" I.D. tubing suitable for pump barrels can be effected in a single pass at a rate of 60 mm/s or 3.6 m/min.

(9) The process can be operated horizontally which greatly reduces capital and handling problems.

(10) And finally, the process is operative on long, thin-walled, small-diameter tubes.

The embodiments of the invention in which an exclusive property or privilege is claimed are defined as follows:

1. A long straight thin-walled small-bore steel tube 8–32 feet long, having an internal diameter of 1 ¼–3 ¼ inches and a wall ⅛–¼ inch thick of substantially constant chemical composition, said tube wall having an internal surface case which has a substantially uniform fully transformed martensitic microstructure, which is in a state of residual compressive stress, which extends across said tube wall's entire internal surface area, and which has a substantially uniform total depth of less than about 1 mm, an effective case depth of HRC 50 of at least about 0.5 mm and a surface hardness of at least HRC 58, the remaining outer base portion of said tube wall being substantially unhardened, with a sharp demarcation between the hardened case portion and the non-hardened base portion.

2. The tube as set forth in claim 1 wherein:
the case has an effective case thickness to HRC 50 of about 0.6–0.8 mm.

3. The tube as set forth in claim 2 wherein:
the tube is formed of plain carbon steel.

4. An oil well downhole reciprocating pump barrel according to claim 1 formed of plain carbon steel.

5. The barrel as set forth in claim 4 wherein:
the case has an effective case thickness to HRC 50 of about 0.6–0.8 mm.

* * * * *